July 22, 1930. W. R. MARTIN 1,771,340
AUTOMATIC WEIGHER AND DRILL STRING PRESSURE RECORDING DEVICE
Filed Nov. 1, 1926 2 Sheets-Sheet 1

INVENTOR
WALTER R. MARTIN
By
ATTORNEY

July 22, 1930.  W. R. MARTIN  1,771,340
AUTOMATIC WEIGHER AND DRILL STRING PRESSURE RECORDING DEVICE
Filed Nov. 1, 1926  2 Sheets-Sheet 2
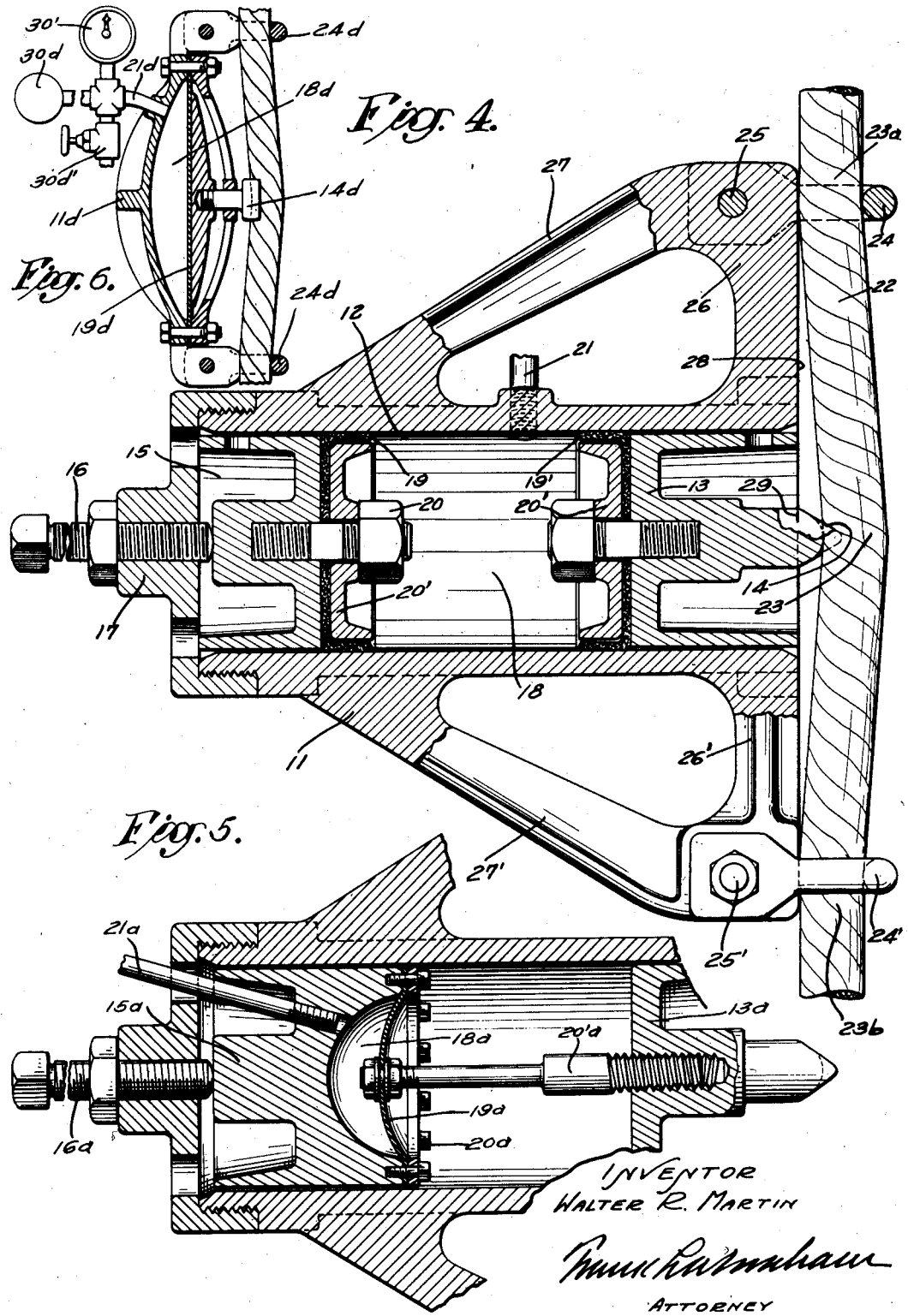
INVENTOR
WALTER R. MARTIN
ATTORNEY Patented July 22, 1930

1,771,340

UNITED STATES PATENT OFFICE

WALTER R. MARTIN, OF LONG BEACH, CALIFORNIA, ASSIGNOR, BY MESNE ASSIGNMENTS, TO MARTIN-DECKER CORPORATION, OF LONG BEACH, CALIFORNIA, A CORPORATION OF DELAWARE

AUTOMATIC WEIGHER AND DRILL-STRING PRESSURE-RECORDING DEVICE

Application filed November 1, 1926. Serial No. 145,683.

Although my present invention may be referred to as an automatic weighing organization especially suitable for the ascertainment of variations in pressure upon a drill bit, the principles of this invention are believed to be generally applicable to the measurement of the weight or pull upon a cable, or the like, by the production and transmission of a fluid pressure; and a preferred embodiment of my invention, as applied to a well drilling organization, may comprise a hydraulic unit applicable to any flexible tension element, such as a so-called "dead line" or a cable leading to a "calf wheel", by which any load is wholly or partly and directly or indirectly moved, or restrained.

It is an object of this invention to provide an organization comprising an hydraulic unit which is adapted to be disposed laterally of any flexible tension member of moderate diameter and to be adjusted to produce a bend or flexing of said member,—the lateral pressure required to produce a given bend in said flexible member, assuming the same to be under tension, being dependent upon the load thereon, and being transmitted to a suitable indicating or recording or controlling instrument, located at any convenient near or remote point.

It is a further object of this invention to provide a simple, rugged and comparatively inexpensive unit of the general character referred to, suitable for either continuous use during drilling or for occasional use, as in fishing or coring,—said unit comprising a pressure-responsive element which is adapted to contact with a cable, or the like, and to be thereby pushed inward against a yielding resistance; and, in preferred embodiments of my invention, the mentioned pressure-responsive element being a plunger which is provided with a finger and which is movable in a passage extending at an angle to the direction in which the cable, or its equivalent, extends, I may confine a suitable fluid in said passage,—connecting the same with a suitable gauge or recorder and providing some suitable means for adjustably varying the position of said plunger, to produce a predetermined bend in said cable, or its equivalent.

It is a further object of my invention to provide an organization of the general character referred to comprising two plungers, which may be disposed in the same cylindrical passage—one plunger having a finger which is adapted to contact with and to flex a member, such as a cable, under tension, held against outward movement; the other mentioned plunger being provided with means to advance it to a predetermined or desired degree,—an inelastic fluid being interposed between said plungers, and suitable means being provided to facilitate ascertainment of both the advancement of said finger and the pressure produced upon said fluid. And, although my organization is intended primarily to ascertain the pull upon a member, such as a cable, whose flexibility is assumed, it should be understood that the principles thereof are applicable also to the estimating of flexbility, or response to bending moments, in members held against bodily outward movement.

It is a further object of this invention to provide means for determining and recording the pull upon a cable, or the like, whether this pull is produced by the action of gravity upon an organization such as a drill string or by other means,—the principles of my invention being such as to render it entirely suitable for use in ascertaining a drawbar pull, a frictional retardation, a strain upon a guy rope, or the like.

It is an object of my invention to provide simple and practical units which are laterally applicable upon flexible rods, chains, or the like, already under tension; and preferred embodiments of my invention are so organized as to permit the application of the same without disconnecting or diminishing the tension upon such rods, chains, cables, or the like; and the facility with which one of my units, weighing only a few pounds, can be put on or taken off is one of its outstanding advantages.

It is an especial object of this invention to provide a comparatively light hydraulic unit, for the purpose indicated, comprising what I may term a floating plunger and an adjustment plunger,—between which a fluid (preferably substantially incompressible, as an oil) is confined, with means for ascertaining the position of said floating plunger and with means for recording variations in pressure upon said fluid; and it is a further object to provide means whereby, essential parts being standardized and instrumental constants or peculiarities being known, reference to a suitable tabulation or chart may enable a total drill load, upon a "dead line", or the like, to be directly or indirectly inferred from an observed or recorded gauge pressure,—the use of a percentage factor, dependent upon the fluid in the well, being then available to disclose, in the case of a drill string, the total weight of pipe carried, with or without tools, by a block-hook, or the like.

It is a fundamental object of this invention to provide drillers and superintendents with means automatically revealing and recording exactly what goes on at a well during an interval of time, such as a twenty-four hour period,—all variations in pull upon a cable being shown upon a circular or other chart; but, although my invention may be especially useful in the recordation of enormous loads, automatically showing every considerable fluctuation therein, the principles relied upon are believed to be applicable, as indicated, to very different uses, such as, for example, the weighing of animals on the hoof, the weighing of cars of a moving train, or the weighing of loaded trucks passing over a load-restricted highway; and it is an important fact that a rather inexpensive and portable organization of the general character referred to may suffice for a wide variety of uses.

Other objects of my invention may be best appreciated from the following description of an illustrative embodiment thereof, taken in connection with the appended claims and the accompanying drawings, in which Fig. 1 may be regarded as an elevational view, essentially diagrammatic, showing a compact organization embodying my invention as disposed in a vertical plane, and suitably to its use in weighing operations—the lower portion of this figure being on a greatly reduced scale.

Fig. 4 is an elevational view, with parts broken away to a median plane, of an hydraulic unit which may be regarded as the central novel feature of my invention.

Fig. 5 is a view corresponding to a part of Fig. 4, but showing features of modification.

Fig. 6 is a similar view, showing a simplified form, as hereinafter described.

Figure 2:
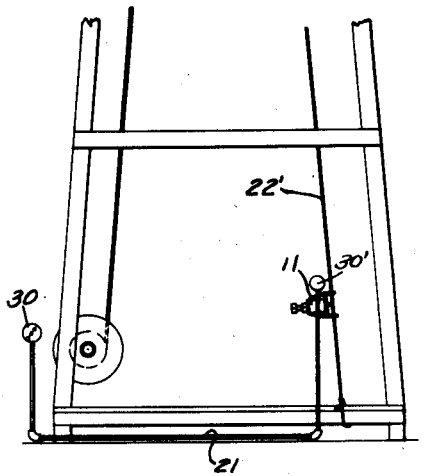
Figs. 2 and 3 are diagrammatic views, on a smaller scale, showing embodiments of my invention as used in ascertaining the weights supported respectively by a so-called "dead line" and a cable extending to the "calf wheel" or anchored to the sill of a drill rig.

Referring to the details of that specific embodiment of my invention chosen for purposes of illustration, 11 may be a main body or casting provided with a central cylindrical bore 12, extending therethrough; and this bore may be adapted to receive both a floating plunger 13 (provided with a pressure finger 14) and an adjustable plunger 15,— shown as movable by a screw 16, extending through a threaded cap 17; and a space 18, between the mentioned plungers (respectively provided with leather or composition cups 19, 19', retained by nuts 20, and washers 20', or with equivalent means to prevent leakage) may contain any desired fluid,—preferably a substantially incompressible liquid, such as an oil.

The floating plunger 13, or its equivalent, being used to transmit pressure from the finger 14, or its equivalent, to the fluid contained within the cylindrical space 18 (which may be in communication with a pressure-indicating, recording and controlling means of any preferred type,—as, through a communicating passage or pipe 21) I may use any suitable means to hold a flexible element, such as a cable 22, in engagement with the finger 14 in such manner as to produce a predetermined bend or bends (as at 23, 23$^a$ and 23$^b$) in said cable. For example, I may use inwardly pulling or retaining hooks, eyes or loops 24, 24", shown as secured by transverse pins or bolts 25, 25', to wings or extensions 26, 26',— which may be integral with the main casting 11 and may comprise reinforcing webs or arms 27, 27' of any desired type.

Figure 3:
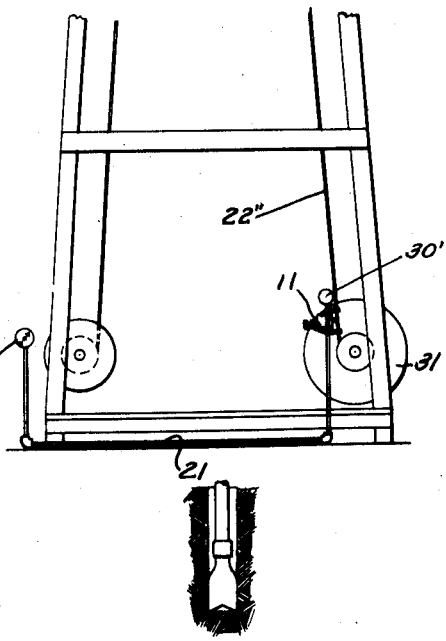

In order to facilitate the application of a unit of the general character described to a rod, chain, cable, or the like, already in position and under tension, it is desirable that, unless the holding or inwardly pulling elements 24 are hooks (as suggested at 24$^a$ and 24$^{a'}$, Fig. 1) and in order that these members may so hold a cable 22, or the like, as to produce predetermined angles or bends therein when the finger 14, or its equivalent, is forced outward, say ½ inch, or to another predetermined extent (as by rotation of the screw 16, transmitting pressure thereto through the respective mentioned plungers and the fluid therebetween) it will be recognized as advantageous that the members 24, 24' shall be provided in various sizes and detachably secured; and, in order to standardize conditions of operation, assuming the mentioned bends in the flexible element 22 to be produced by outward pressure of the finger 14 (rather than by an inward movement of the members 24, 24') relatively to a straight surface 28 between the holding members 24, 24' (whose pivots may be, say, 12 inches apart) I may provide upon said finger, or upon parts connected therewith, any desired graduations or guide marks,—a single guide mark being shown at 29 as adjusted to fall within the plane of the surface 28; and, assuming the pipe 21, or its equivalent, to provide communication with a recording or other gauge, such as one of the gauges shown at 30, Figs. 2 and 3, not only the space 18 but the pipe 21 being filled with a suitable fluid, it will be obvious that the readings of said gauge (mere indicating gauges and recording gauges being alike referred to hereafter as "pressure-revealing means") must depend upon the tension of the flexible member 22,—whether such tension is produced by a weight, such as that of a drill string, or by other means.

Although I show a unit comprising a main casting 11 as secured, in Fig. 2, upon a so-called "dead line" 22', a similar unit being shown in Fig. 3 as secured on a cable 22" wound upon a calf wheel 31, the pressure gauges 30, shown in these figures being preferably recording gauges positioned at a distance but within the easy range of vision of the driller (to afford guidance to and record of his operations, in a manner hereinafter more fully described) I show diagrammatically, in Fig. 1, an organization in which a pressure gauge 30', which may or may not be a recording gauge, is carried quite directly by a main casting or body 11,—the pipe 21 being very short, and the flexible element 22''' being shown as suspended at its upper end from a fixed member 32 and as provided at its lower end with a pan or housing or other suitable support 33 for objects to be weighed; and it will be appreciated that, since the flexible element 22''' may be of any required strength, an organization of the general character diagrammatically illustrated in this figure (comprising an hydraulic unit adapted to be permanently or removably attached in a lateral position to any cable, or equivalent element under stress either before or after the latter is put under tension) provides very simple, inexpensive, and rugged means, for the approximate or exact determination of weights; and that said weights may be much larger than are commonly indicated or recorded by equally light and inexpensive means; and that the readings of the gauge may be either in terms of actual pressure upon the fluid confined within a space such as the space 18 or in terms of pounds or tons supported by the flexible element 22''', or its equivalent.

Figure 1:
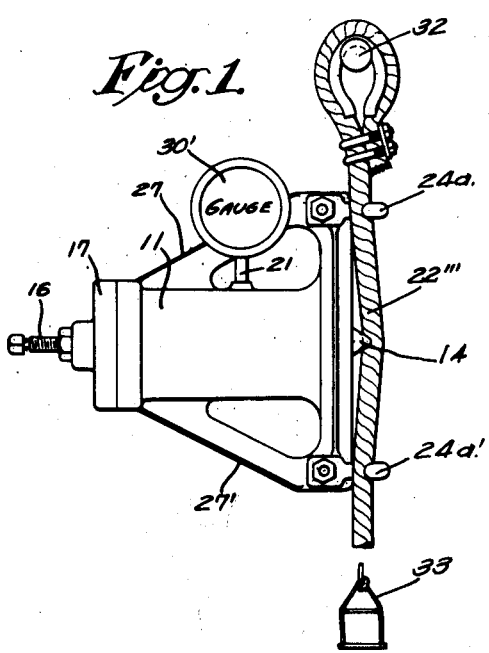

An organization of the general character shown in Fig. 1 is especially suitable for use, when provided with a recording gauge, in the weighing of animals successively driven over or through a weight support 33, or its equivalent; and it will be obvious that, depending upon the strength of the fixed member 32 and the flexible element 22''', the weight support 33 may, if desired, be so constructed as to permit loaded trucks, or cars constituting a railway train, to pass successively thereover,—automatic tallying and weighing being incidentally effected by the gauge 30', or its equivalent.

Although I have herein described a single complete embodiment of my invention, suggesting various alternative details and uses, it should be understood that various features thereof may be independently used and also that numerous modifications might be made by those skilled in the art to which this case relates, without the slightest departure from the spirit and scope of this invention, as the same is indicated above and in the subjoined claims.

For example, as suggested in Fig. 5, instead of employing cups on a plurality of plungers, to prevent leakage of a fluid confined therebetween, I may provide an adjustable plunger $15^a$ with a diaphragm $19^a$ (shown as held by a ring and nuts $20^a$) to confine a fluid in a chamber $18^a$; and pressure may be imparted to said fluid, for transmission through a flexible pipe $21^a$ (communicating with a gauge, recording or control device in the general manner above referred to) by means such as a rod $20'^a$, adjustably or otherwise connected both with a finger-carrying plunger or guide $13^a$ and with said diaphragm. The diaphragm $19^a$, or its equivalent may advantageously be formed of a flexible but substantially inextensible sheet material, such as a treated fabric, so applied as to give a "sloppy" fit; and a screw $16^a$ may be used, as in the first described embodiment of my invention, to effect an initial adjustment,—all alternative embodiments being entirely similar, in general mode of operation and use, to said first-described embodiment.

In the simplified form shown in Fig. 6, the body $11^d$ directly provides a chamber $18^d$, and a finger $14^d$ may be brought to a standard initial position relatively to eyes or loops $24^d$, $24^{d'}$; either by rotating the same or by the delivery or withdrawal of liquid through a valved branch pipe $30^{d'}$ communicating with said chamber and with pipe $21^d$, extending to a near or remote gauge, recorder and/or control device $30^d$,—movements of the diaphragm $19^d$, in response to variations in the tension of the cable $22^d$ being thus readable, from a near or remote point; and it should be understood that, if desired, any or all embodiments of my invention may include not only a remote recorder (as suggested at 30, Figs. 2 and 3, and at $30^d$, Fig. 6, for use by supervisory officials) but also a conveniently visible gauge 30', for continuous observation by a driller, throughout the day.

I claim as my invention:

1. For use in a stress-revealing organization: a main body which has a liquid-containing space and which is provided with means for holding a flexible member against lateral movement at spaced points; a part which is located between said points and is adapted to form a bend in said flexible member, between said points, said part being movable to vary the liquid-containing space within said body; and means for connecting said liquid-containing space to means for revealing variations in the pressure applied to said laterally movable part by said flexible member,—said liquid-confining space being provided by a cylindrical bore and by a plurality of plungers in the bore, one of said plungers being adjustable by means of a screw and the other of said plungers being movable indirectly by movement of the liquid by said adjustable plunger and directly by means of said movable part.

2. For use in a stress-revealing organization: a main body which has a liquid-containing space and which is provided with means for holding a flexible member against lateral movement at spaced points; a part which is located between said points and is adapted to form a bend in said flexible member, between said points, said part being movable to vary the liquid-containing space within said body; and means for connecting said liquid-containing space to means for revealing variations in the pressure applied to said laterally movable part by said flexible member,—said liquid-confining space being provided by a cylindrical bore and by a plurality of plungers in the bore, one of said plungers being adjustable by means of a screw and the other of said plungers being movable indirectly by movement of the liquid by said adjustable plunger and directly by said movable part, to respond, in said last-mentioned movements, to variations in the tension of said flexible member.

3. In a tension measuring device, a cylinder, means carried by the cylinder for engaging a rope at spaced points, a pair of relatively movable members in said cylinder and cooperating therewith to provide a fluid pressure chamber between the members, a rope engaging element carried by one of said members to engage the rope intermediate the points of engagement of the first means, means for adjusting the other element and thereby varying the position of the chamber within the cylinder, and a conduit leading from the chamber and adjusted for connection to a fluid operated pressure gauge.

4. In a tension measuring device, a cylinder, means carried by the cylinder for engaging a rope at spaced points, a pair of relatively movable pistons movably mounted in the cylinder in spaced relation to each other to form with the cylinder a fluid chamber between the pistons, a rope engaging element carried by one piston to engage the rope intermediate the points of engagement of said means, adjusting means for variably positioning the second piston in said cylinder, and a conduit leading from a point in the cylinder between the pistons for connection to a fluid pressure gauge.

5. In a rope tension measuring device, a cylinder having one end open and provided with a closure at its opposite end, rope engaging means supported from the cylinder adjacent its open end for engagement with a rope at spaced points to hold the cylinder at right angles to the rope, a piston in the cylinder at the open end, a pressure finger projecting from said piston and engaging the rope centrally between the first mentioned rope engaging means, a second piston in the cylinder at its closed end, an adjusting screw threaded through the cylinder closure and engaging the second piston to adjust its position in said cylinder, cup packings carried by said pistons and confronting each other, and means for connecting a pressure gauge to said cylinder between said packings.

6. In a rope tension measuring device, a cylinder having one end open and provided with a closure at its opposite end, arms projecting diametrically from said cylinder at the open end thereof, loops pivoted to said arms and forming rope engaging means, a piston in the cylinder at the open end, a pressure finger projecting from said piston and engaging the rope centrally between the first mentioned rope engaging means, a second piston in the cylinder at its closed end, an adjusting screw threaded through the cylinder closure and engaging the second piston to adjust its position in said cylinder, cup packings carried by said pistons and confronting each other, and means for connecting a pressure gauge to said cylinder between said packings.

In testimony whereof, I have hereunto set my hand at Los Angeles, California, this 3 day of September, 1926.

WALTER R. MARTIN.